United States Patent
Becker et al.

(10) Patent No.: US 11,384,206 B2
(45) Date of Patent: Jul. 12, 2022

(54) DEVOLATIZATION OF HIGHLY VISCOUS SILICONE FLUIDS IN THE SHORT PATH EVAPORATOR

(71) Applicant: Wacker Chemie AG, Munich (DE)

(72) Inventors: Nils Becker, Burghausen (DE); Dominik Becher, Haiming (DE); Josef Fuerst, Mehring (DE); Johann Schuster, Emmerting (DE)

(73) Assignee: WACKER CHEMIE AG, Munich (DE)

( * ) Notice: Subject to any disclaimer, the term of this patent is extended or adjusted under 35 U.S.C. 154(b) by 650 days.

(21) Appl. No.: 16/321,566

(22) PCT Filed: Aug. 4, 2016

(86) PCT No.: PCT/EP2016/068650
§ 371 (c)(1),
(2) Date: Jan. 29, 2019

(87) PCT Pub. No.: WO2018/024334
PCT Pub. Date: Feb. 8, 2018

(65) Prior Publication Data
US 2021/0292485 A1    Sep. 23, 2021

(51) Int. Cl.
*B01D 1/00* (2006.01)
*C08G 77/34* (2006.01)
*B01D 1/22* (2006.01)
*B01D 5/00* (2006.01)

(52) U.S. Cl.
CPC ........... *C08G 77/34* (2013.01); *B01D 1/0082* (2013.01); *B01D 1/225* (2013.01); *B01D 5/0045* (2013.01)

(58) Field of Classification Search
CPC .... B01D 1/0082; B01D 1/225; B01D 5/0045; C08G 77/34
See application file for complete search history.

(56) References Cited

U.S. PATENT DOCUMENTS

| | | |
|---|---|---|
| 3,054,444 A | 9/1962 | Robbins |
| 3,292,683 A * | 12/1966 | Buchi .................... B01D 1/223 159/6.2 |
| 4,687,829 A | 8/1987 | Chaffee et al. |
| 4,772,675 A | 9/1988 | Klosowski et al. |
| 4,871,827 A | 10/1989 | Klosowski et al. |
| 4,954,303 A * | 9/1990 | Moore .................... B29C 48/76 264/101 |
| 5,233,007 A | 8/1993 | Yang |
| 5,276,123 A | 1/1994 | King et al. |
| 5,854,343 A * | 12/1998 | Schuster ............... B29C 48/365 524/847 |
| 8,455,607 B2 * | 6/2013 | Zhou ....................... C08J 3/2053 528/43 |
| 8,664,321 B2 * | 3/2014 | Schuster .................. B29B 7/90 524/493 |
| 2007/0216061 A1 * | 9/2007 | Karthauser ........... B08B 7/0021 264/236 |
| 2010/0152327 A1 | 6/2010 | Schuster et al. |
| 2011/0132551 A1 * | 6/2011 | Klapdohr ............. C08G 18/755 159/49 |
| 2011/0301374 A1 | 12/2011 | Selbertinger et al. |
| 2013/0045292 A1 * | 2/2013 | Zhou ....................... C08L 83/04 425/129.1 |
| 2015/0038736 A1 | 2/2015 | Morioka et al. |

FOREIGN PATENT DOCUMENTS

| | | | |
|---|---|---|---|
| DE | 950397 A | 10/1956 | |
| DE | 950397 C | * 10/1956 | ............... B01D 3/16 |
| DE | 1444326 A1 | 12/1968 | |
| DE | 10227590 A1 | 11/2002 | |
| DE | 102012015723 A1 | 2/2013 | |
| EP | 2206737 B1 | 2/2013 | |
| JP | 62207367 A | 9/1987 | |
| JP | 62207383 A | 9/1987 | |
| JP | 6172536 A | 6/1994 | |
| JP | 9508665 A | 9/1997 | |
| JP | 2012512920 A | 6/2012 | |
| WO | 9521889 A1 | 8/1995 | |
| WO | WO10003770 A1 | 1/2010 | |

OTHER PUBLICATIONS

ESPACENET Machine Translation of DE950397 Obtained Aug. 4, 2021. (Year: 2021).*

* cited by examiner

*Primary Examiner* — Jonathan Miller
(74) *Attorney, Agent, or Firm* — Brooks Kushman P.C.

(57) ABSTRACT

Volatile siloxanes, particularly those of a cyclic nature, are removed from high viscosity silicone polymers and high viscosity silicone compositions by evaporation in a short path evaporator.

12 Claims, No Drawings

DEVOLATIZATION OF HIGHLY VISCOUS SILICONE FLUIDS IN THE SHORT PATH EVAPORATOR

CROSS REFERENCE TO RELATED APPLICATIONS

This application is the U.S. National Phase of PCT Appln. No. PCT/EP2016/068650 filed Aug. 4, 2016, the disclosure of which is incorporated in their entirety by reference herein.

BACKGROUND OF THE INVENTION

1. Field of the Invention

The invention relates to a method for removing volatile constituents from high-viscosity silicone fluids in a short path evaporator.

2. Description of the Related Art

Silicone manufacturers produce crosslinkable polymer compositions, examples being silicone compositions which crosslink ("vulcanize") with moisture at room temperature (RTV). These compositions consist substantially of one or more than one polydimethylsiloxane, fillers and other additives. The compounding operation itself produces unwanted byproducts, such as low molecular mass, cyclic, linear and branched siloxanes. These siloxanes are encountered as a volatile component in the later, vulcanized end product of the manufacturer. In view of continually rising quality requirements, not least in the health and baby care segment, the amount of volatile constituents in the end product is governed by standards including a BfR [German Federal Institute for Risk Assessment] (<=0.5% after 4 h of heating at 200° C.). In order to comply with the limiting value, it is usually necessary, in practice, for the vulcanized end product to undergo a baking step. This represents an additional operating step for the manufacturer, with implications for time and cost.

SUMMARY OF THE INVENTION

The subject of the invention is a method for removing volatile constituents from high-viscosity silicone polymers or silicone compositions in a short path evaporator.

DETAILED DESCRIPTION OF THE PREFERRED EMBODIMENTS

In the present method, the high-viscosity silicone polymers or silicone compositions are freed from volatile constituents even prior to crosslinking. The removal of volatile constituents from the as yet unvulcanized silicone polymers or silicone compositions is substantially more economical and more eco-friendly, and leads to vulcanized end products having a very low level of volatile constituents. There is no need for the step of baking the vulcanized end product.

The short path evaporator is described in DE1444326A, for example. It comprises a vertically disposed cylinder having a heating jacket which heats the inner wall of the cylinder; a rotor; and an internal condenser. Mounted on the rotor-carrying facility are wiper elements and conveying elements.

The silicone polymers or silicone compositions are fed by a feed at the top of the cylinder on the inner wall. The wiper elements and conveying elements of the rotor-carrying facility bring about distribution of the silicone polymers or silicone composition in the form of a thin layer on the heated inner wall. In this process, volatile constituents are evaporated. The helical design of the conveying elements results in forced conveying in the direction of the discharge facility lying on the base of the apparatus. The rotor is typically operated in a speed range of 0.1-100 rpm, preferably 0.3-30 rpm, more preferably 1-26 rpm.

A portion of the volatile constituents is condensed on a condenser situated internally in the cylinder. That fraction of the silicone polymers or silicone composition that is not evaporated reaches the lower region of the short path evaporator, and leaves the evaporator via the product outlet. The uncondensed, volatile constituents and any gases pass through the vacuum port and optionally via a cold trap into the vacuum system.

The viscosity of the high-viscosity silicone polymers is preferably 1000 to 20,000 Pa*s, more preferably 5000 to 12,000 Pa*s. The viscosity of the high-viscosity silicone compositions is preferably 100 to 20,000 Pa*s, more preferably 400 to 12,000 Pa*s, in each case measured at 25° C. and shear factor D=1.

The high-viscosity silicone compositions preferably contain at least 50 wt %, more preferably at least 70 wt %, and most preferably at least 90 wt % of silicone polymer.

The silicone polymer contains, for example, no functional groups, as in the case of silicone oils, or is, for example, a base polymer having condensable end groups, as for RTV-1 or RTV-2 compounds, or is, for example, a base polymer having unsaturated alkyl groups, for LSR or HTV compounds, for example, or Si—H functional, Si-vinyl, phenyl-containing or fluorine-containing base polymer. It is possible for one kind of silicone polymer or a mixture of at least two kinds of silicone polymers to be used.

Examples of high-viscosity silicone compositions are RTV-1, RTV-2 or LSR compounds.

Besides silicone polymer, the high-viscosity silicone compositions preferably comprise fillers. Preferred fillers are silicas, more particularly silicas produced by precipitation, or pyrogenically.

The silicas preferably have a specific BET surface area of 30 to 500 $m^2/g$, more preferably 100 to 300 $m^2/g$. The BET surface area is measured according to known methods; in one preferred version, the specific surface area is measured as BET surface area by means of nitrogen BET-$N_2$ at the boiling temperature of liquid nitrogen, preferably in accordance with Deutsche Industrie Norm [German Industry Standard] DIN 66131 and DIN 66132.

The high-viscosity silicone compositions may comprise further fillers, either in addition to silicas or instead of silicas. Examples of further fillers are nonreinforcing fillers, these being fillers having a BET surface area of up to 50 $m^2/g$, such as quartz, diatomaceous earth, calcium silicate, zirconium silicate, zeolites, metal oxide powders, such as aluminum, titanium, iron or zinc oxides and/or their mixed oxides, barium sulfate, talc, kaolin, silicon nitride, silicon carbide, boron nitride, glass powders, and plastics powders, such as polyacrylonitrile powders; and reinforcing fillers, these being fillers having a BET surface area of more than 50 $m^2/g$, such as carbon blacks, examples being furnace black and acetylene black, and mixed silicon-aluminum oxides of high BET surface area; fibrous fillers, such as asbestos, and also polymeric fibers. The stated fillers may have been hydrophobized, by means, for example, of treatment with organosilanes and/or organosiloxanes or by etherification of hydroxyl groups to alkoxy groups.

When abrasive fillers are used, it is advisable to provide armored versions, particularly of the wiper elements and conveying elements, mounted on the rotor-carrying facility.

The high-viscosity silicone compositions preferably contain preferably 10 to 200 parts by weight, more preferably 30 to 150 parts by weight, and most preferably 50 to 120 parts by weight of filler per 100 parts by weight of organopolysiloxane.

In addition to silicone polymer and filler, the high-viscosity silicone compositions may comprise further substances. Preferred examples of further substances are plasticizers, catalysts, fungicides, adhesion promoters, rheological additives and pigments, and mixtures thereof.

The volatile constituents are preferably cyclic siloxanes of low molecular mass, such as D3 to D30, more particularly D4 to D18, linear siloxanes having 2 to 30 silicon atoms, more particularly 3 to 18 silicon atoms, and traces of water.

The high-viscosity silicone compositions are crosslinking silicone compositions (RTV) or liquid silicones (LSR), which may crosslink by addition, by condensation or peroxidically.

The absolute pressure in the short path evaporator in the method is preferably 0.01 Pa to 500 Pa, more preferably 0.2 Pa to 10 Pa, most preferably 0.5 Pa to 5 Pa.

The temperature of the high-viscosity silicone compositions in the short path evaporator (operating temperature), preferably measured on the inner wall of the cylinder, is preferably 150° C. to 240° C., in the method, more preferably 180° C. to 230° C., most preferably 200° C. to 220° C.

The high-viscosity silicone polymers or silicone compositions are preferably heated before being fed into the short path evaporator. The high-viscosity silicone polymers or silicone compositions are preferably heated with the aid of a dynamic mixer via introduction of shearing energy. Preferably the high-viscosity silicone polymers or silicone compositions are brought to operating temperature by heating. There is preferably degassing of the silicone polymers or silicone compositions before entry into the short path evaporator, preferably by means of a flashbox.

The short path evaporator is preferably charged from containers, preferably applied via hoppers with a connected displacer pump, more particularly from drums using pumps, especially scoop piston displacement pumps. With particular preference, charging takes place directly from the upstream operation of producing the silicone polymers or silicone composition.

The high-viscosity silicone polymers or silicone compositions freed from volatile constituents are preferably discharged from the short path evaporator by a conical discharge with the aid of a level-controlled displacement pump, more particularly by means of gear pumps.

The high-viscosity silicone polymers or silicone compositions discharged from the short path evaporator are preferably cooled to room temperature by means of a dynamic or static heat exchanger, more particularly by means of a static heat exchanger.

The high-viscosity silicone polymers or silicone compositions freed from volatile constituents are preferably dispensed into storage containers, preferably mobile storage containers, such as drums. With particular preference, the high-viscosity silicone polymers or silicone compositions freed from volatile constituents are subjected directly to further processing.

The volatile constituents which have condensed out on the internal condenser are preferably discharged via a free overflow with vacuum barrier.

The viscosity figures for the organopolysiloxanes and the high-viscosity silicone compositions are preferably based preferably on measurement in accordance with DIN 54458 with the aid of amplitude sweep. Measurement is via plate/plate with a cone having a diameter of 25 mm and a distance of 0.5 mm, with a circular frequency of 10 Hz. The figures reported are the viscosities $\eta^*(\gamma=100\%)$: this corresponds to the complex viscosity value [mPa*s] at a deformation of 100% in accordance with DIN 54458.

The viscosity figures for the silicone oils and silicone polymers are based preferably on measurement in accordance with DIN 53019/DIN EN ISO 3219.

The sum total of all the constituents of the high-viscosity silicone compositions adds up to 100 wt %.

EXAMPLES

Example 1. Removal of Volatile Constituents from a Silicone Polymer

Volatile constituents (collective parameter D4-D18) are removed from a silicone polymer (polydimethylsiloxane having vinyl groups) having a viscosity of 10,000 Pas.

By treatment with a short path evaporator, a reduction in volatile constituents (collective parameter D4-D18) from 1.3% to 0.3% is possible. A BfR value of 0.32 is achieved in the devolatilized silicone polymer.

The silicone polymer comes directly from the production plant (polymer reactor in which the polycondensation occurs) and is supplied to the short path evaporator via a gear pump. In this case, the silicone polymer passes through a dynamic rotor-stator mixer, which by introduction of shearing energy heats the silicone polymer to the required devolatilization temperature of around 210° C.

The silicone polymer enters at the top of the short path evaporator. This evaporator is operated at around 207° C. under an absolute pressure of 3 Pa. The rotor-carrying facility of the short path evaporator rotates with a speed of approximately 7 $min^{-1}$. The wiper elements and conveying elements of the rotor-carrying facility bring about distribution of the silicone polymer in the form of a thin layer on the heated inner wall. In this process, volatile constituents are evaporated. The helical design of the conveying elements results in forced conveying in the direction of the discharge facility lying on the base of the apparatus.

Volatile, condensable constituents are condensed out on the internal condenser, and leave the apparatus via a free overflow with vacuum barrier.

The devolatilized silicone polymer is discharged by means of a level-controlled gear pump on the conical base of the short path evaporator. Before being dispensed into drums, the silicone polymer is cooled to around 80° C. by means of a static plate-type heat exchanger.

Example 2. Removal of Volatile Constituents from a Silicone Composition

Volatile constituents (collective parameter D4-D18) are removed from a silicone composition (polydimethylsiloxane having vinyl groups and around 40 wt % of silica auxiliary), having a viscosity of >1000 Pas.

By treatment with a short path evaporator, a reduction in volatile constituents (collective parameter D4-D18) by 80% is possible. A BfR value of 0.259 is achieved in the devolatilized silicone composition (relative to a BfR value of 0.966 in the undevolatilized silicone composition).

The silicone composition is supplied in drums and passed with the aid of scoop piston displacement pumps to the short path evaporator. In this case, the silicone composition passes through a dynamic rotor-stator mixer, which by introduction of shearing energy heats the silicone composition to the required devolatilization temperature of around 210° C.

The silicone composition enters at the top of the short path evaporator. This evaporator is operated at around 207° C. under an absolute pressure of 3 Pa. The rotor-carrying facility of the short path evaporator rotates with a speed of approximately 23 min$^{-1}$. The wiper elements and conveying elements of the rotor-carrying facility bring about distribution of the silicone composition in the form of a thin layer on the heated inner wall. In this process, volatile constituents are evaporated. The helical design of the conveying elements results in forced conveying in the direction of the discharge facility lying on the base of the apparatus.

Volatile, condensable constituents are condensed out on the internal condenser, and leave the apparatus via a free overflow with vacuum barrier.

The devolatilized silicone composition is discharged by means of a level-controlled gear pump on the conical base of the short path evaporator. Before being dispensed into drums, the silicone composition is cooled to room temperature by means of a static plate-type heat exchanger.

The invention claimed is:

1. A method for removing volatile constituents from a high-viscosity silicone polymer having a viscosity of 1000 to 20,000 Pa*s or a silicone composition having a viscosity of 100 to 20,000 Pa*s, comprising:
   introducing the high viscosity silicone polymer or the silicone composition into a short path evaporator which comprises a vertically disposed cylinder having a heating jacket which heats the inner wall of the cylinder; a rotor, and an internal condenser, wherein mounted on the rotor are wiper elements and conveying elements, which distribute the silicone polymers or silicone composition in the form of a thin layer on the heated inner wall and convey the silicone polymers or silicone composition toward an outlet, wherein the silicone polymers or silicone compositions are fed by a feed at the top of the cylinder onto the inner wall, and
   evaporating volatile constituents and collecting a high viscosity silicone polymer or silicone composition containing less volatiles, wherein the viscosities are measured at 25° C. in accordance with DIN 54458.

2. The method of claim 1, wherein the volatiles comprise D3 to D30 cyclic polysiloxanes and linear polysiloxanes having 2 to 30 silicon atoms.

3. The method of claim 1, wherein the silicone polymer is a silicone polymer containing no functional groups, a silicone base polymer having condensable end groups, a silicone base polymer having unsaturated alkyl groups, or Si—H, Si-vinyl, phenyl-containing or fluorine-containing silicone base polymers.

4. The method of claim 1, wherein the silicone composition comprises an RTV-1, RTV-2, or LSR composition.

5. The method of claim 1, wherein the high-viscosity silicone composition contains at least 40 wt % of organopolysiloxane.

6. The method of claim 1, wherein the high-viscosity silicone composition comprises fillers.

7. The method of claim 1, wherein the absolute pressure in the short path evaporator is 0.01 Pa to 500 Pa.

8. The method of claim 1, wherein the temperature of the high-viscosity silicone polymer or high viscosity silicone composition in the short path evaporator is 150° C. to 240° C.

9. The method of claim 1, wherein the high-viscosity silicone polymer or high viscosity silicone compositions are heated before being fed into the short path evaporator.

10. The method of claim 1, wherein the silicone polymers or high viscosity silicone compositions are degassed before entry into the short path evaporator.

11. The method of claim 9, wherein heating is effected by exposing the high viscosity silicone polymer or high viscosity silicone composition to high shear.

12. The method of claim 1, wherein volatiles are removed from a high viscosity silicon composition containing a filler selected from the group consisting of silica, carbon black, silicon-aluminum oxides, and mixtures thereof.

* * * * *